US008594369B2

(12) United States Patent
Zavagli et al.

(10) Patent No.: US 8,594,369 B2
(45) Date of Patent: Nov. 26, 2013

(54) AUTOMATIC DETECTION OF FIRES ON EARTH'S SURFACE AND OF ATMOSPHERIC PHENOMENA SUCH AS CLOUDS, VEILS, FOG OR THE LIKE, BY MEANS OF A SATELLITE SYSTEM

(71) Applicant: TELESPAZIO S.p.A, Rome (IT)

(72) Inventors: Massimo Zavagli, Rome (IT); Mario Constantini, Lapedona (IT)

(73) Assignee: Telespazio S.p.A., Rome (IT)

( * ) Notice: Subject to any disclaimer, the term of this patent is extended or adjusted under 35 U.S.C. 154(b) by 0 days.

(21) Appl. No.: 13/743,506

(22) Filed: Jan. 17, 2013

(65) Prior Publication Data

US 2013/0129147 A1 May 23, 2013

Related U.S. Application Data

(63) Continuation of application No. 12/375,381, filed as application No. PCT/EP2007/057802 on Jul. 27, 2007, now Pat. No. 8,369,563.

(30) Foreign Application Priority Data

Jul. 28, 2006 (EP) .................................... 06118139

(51) Int. Cl.
G06K 9/00 (2006.01)
G06K 9/62 (2006.01)

(52) U.S. Cl.
USPC .......................... 382/100; 382/103; 382/224

(58) Field of Classification Search
None
See application file for complete search history.

(56) References Cited

U.S. PATENT DOCUMENTS

| 6,184,792 | B1* | 2/2001 | Privalov et al. | 340/578 |
| 6,496,593 | B1* | 12/2002 | Krone et al. | 382/104 |
| 7,860,344 | B1* | 12/2010 | Fitzpatrick et al. | 382/291 |
| 2002/0041328 | A1* | 4/2002 | LeCompte et al. | 348/144 |
| 2002/0176638 | A1* | 11/2002 | Stone et al. | 382/294 |
| 2003/0065409 | A1* | 4/2003 | Raeth et al. | 700/31 |
| 2003/0095181 | A1* | 5/2003 | LeCompte | 348/144 |
| 2005/0096866 | A1* | 5/2005 | Shan et al. | 702/179 |
| 2005/0104771 | A1* | 5/2005 | Terry et al. | 342/195 |
| 2007/0217683 | A1* | 9/2007 | Kinoshita | 382/190 |
| 2008/0130952 | A1* | 6/2008 | Mittal et al. | 382/103 |
| 2008/0181454 | A1* | 7/2008 | Wirtz et al. | 382/103 |
| 2013/0022233 | A1* | 1/2013 | Ma et al. | 382/103 |

OTHER PUBLICATIONS

Mandel et al ("Towards a Dynamic Data Driven Application System for Wildfire Simulation", 2005).*

(Continued)

Primary Examiner — David Zarka
Assistant Examiner — Avinash J Yentrapati
(74) Attorney, Agent, or Firm — Volpe and Koenig, P.C.

(57) ABSTRACT

A method is provided for automatically detecting fires on Earth's surface by satellite. The method includes: acquiring multi-spectral images of the Earth at different times, each a collection of single-spectral images each associated with a respective wavelength, each image being made up of pixels each indicative of a spectral radiance from a respective area of the Earth; computing an adaptive predictive model predicting spectral radiances at a considered time for considered pixels based on previously acquired spectral radiances of the considered pixels and those previously predicted for the considered pixels by the adaptive predictive model; comparing acquired spectral radiances of the considered pixels at a considered time with those predicted at the same considered time for the considered pixels by the adaptive predictive model; and detecting fires or atmospheric phenomena in areas of the Earth's surface or atmosphere corresponding to the considered pixels based on an outcome of the comparison.

16 Claims, 6 Drawing Sheets

(56) References Cited

OTHER PUBLICATIONS

Arrue et al ("An Intelligent system for false alarm reduction in Infrared forest-fire detection," IEEE Intelligent systems 2000).*

Sukhinin ("AVHRR-based mapping of fires in Russia: New products for fire management and carbon cycle studies", 2004).*

Cisbani E et al. "Early Fire Detection System Based on Multi-Temporal Images of Geostationary and Polar Satellites" Geoscience and Remote Sensing Symposium, 2002 USA, IEEE, vol. 3, Jun. 24, 2002, pp. 1506-1508, XP010598266.

Calle et al. "Latest Algorithms and Scientific Developments for Forest Fire Detection and Monitoring Using MSG/SEVIRI and MODIS Sensors" Recent Advances in Space Technologies 2005. RAST 2005, Proceedings of 2nd Int'l Conference on Istanbul, Turkey Jun. 9-11, 2005, Piscataway, NJ, USA, IEEE, Jun. 9, 2005, pp. 118-123, XP010838587.

Arrue et al. "An Intelligent System for False Alarm Reduction in Infrared Forest-Fire Detection" IEEE Intelligent Systems, 2000.

Coen et al. "Wildfire Dynamic Data-Driven Application System" Center for Computational Mathematics Reports, 2006.

* cited by examiner

Contributions to the acquired radiance:
1) earth emission
2) atmosphere up-welling emission
3) atmosphere down-welling emission
4) sun reflected radiance

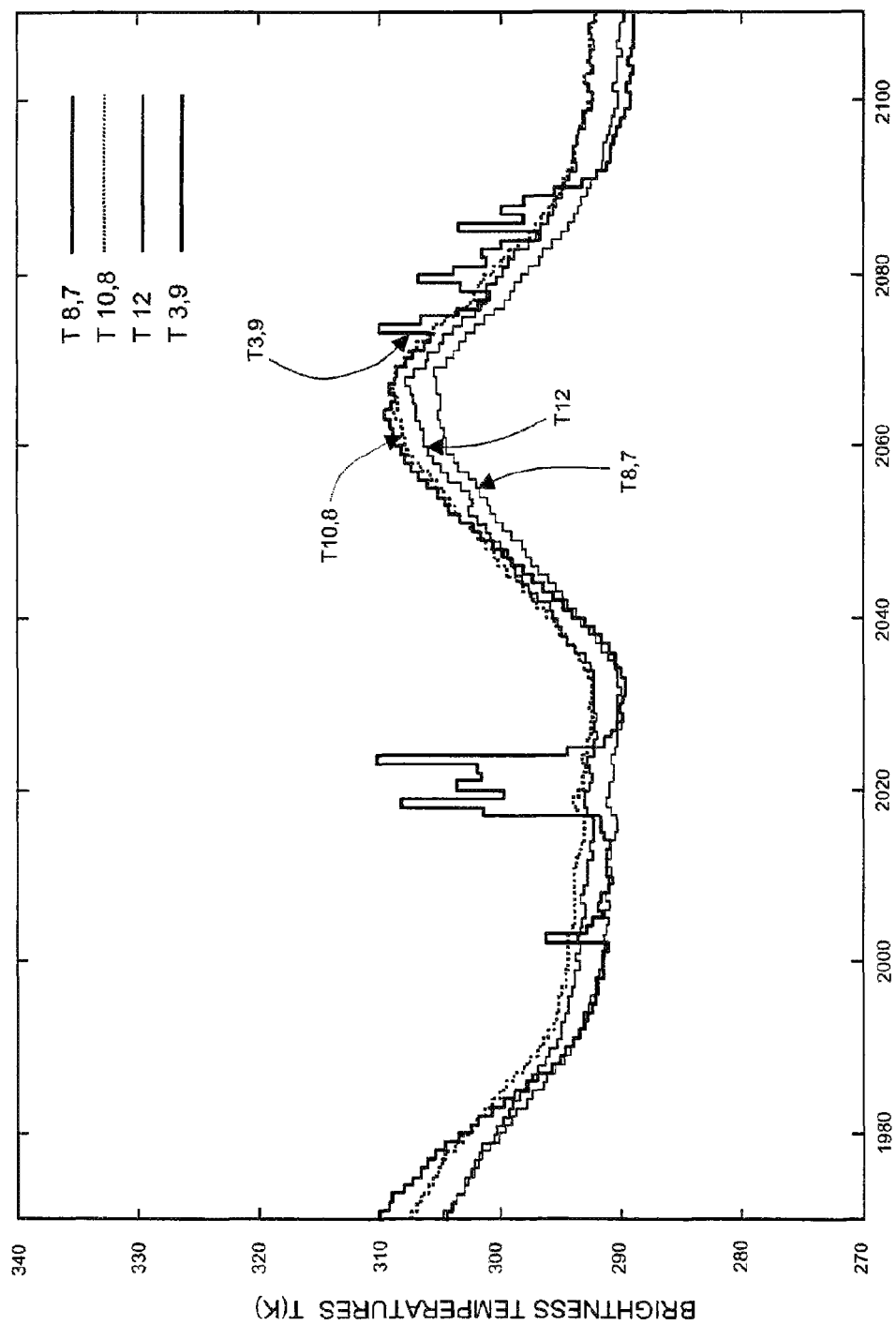

| Overall Burned Area [hectares] | $P_d$ [%] |
|---|---|
| > 1 | 61 |
| > 2 | 70 |
| > 5 | 84 |
| > 15 | 100 |
| > 60 | 100 |

Fig. 4

| Estimated Fire Size ($f_t$) [hectares] | $P_{fd}$ [%] |
|---|---|
| > 0.26 | 3.65 |
| > 0.28 | 3.61 |
| > 0.30 | 1.50 |
| > 0.33 | 0.34 |
| > 0.35 | 0.00 |

Fig. 5

AUTOMATIC DETECTION OF FIRES ON EARTH'S SURFACE AND OF ATMOSPHERIC PHENOMENA SUCH AS CLOUDS, VEILS, FOG OR THE LIKE, BY MEANS OF A SATELLITE SYSTEM

INCORPORATION BY REFERENCE

The following documents are incorporated herein by reference as if fully set forth: U.S. patent application Ser. No. 12/375,381, filed Jul. 1, 2009; PCT/EP2007/057802, filed Jul. 27, 2007; European Patent Application No. 06118139.6, filed Jul. 28, 2006.

FIELD OF THE INVENTION

The present invention concerns with automatic detection of fires on Earth's surface and of atmospheric phenomena such as clouds, veils, fog or the like, by means of a satellite system, in particular by exploiting multi-spectral data acquired by multi-spectral sensors of a geostationary or polar satellite system.

BACKGROUND

As is known, multi-spectral images are images acquired by Remote Sensing (RS) radiometers, each acquiring a digital image (in remote sensing, called a scene) in a small band of visible spectra, ranging from 0.4 μm to 0.7 μm, called red-green-blue (RGB) region, and going to infra-red wavelengths of 0.7 μm to 10 or more μm, classified as NIR (Near Infra-Red), MIR (Middle InfraRed), FIR (Far InfraRed) or TIR (Thermal InfraRed). A multi-spectral image is hence a collection of several single-spectral (single-band or monochrome) images of the same scene, each taken with a sensor sensitive to a different wavelength.

Different fire detection techniques, based on threshold criteria and contextual algorithms, have been developed for multi-spectral polar sensors and, in the last years, for geostationary sensors. For a detailed discussion of these techniques reference may, for example, be made to Kaufman, Y. J., Justice, C. O., Flynn, L. P. Kendal, J. D., Prins, E. M., Giglio, L. Ward, D. E. Menzel, W. P. and Setzer, A. W., 1998, *Potential global fire monitoring from EOS-MODIS*, Journal of Geophysical Research, 103, 32215-32238, and Giglio, L., Descloitres, J., Justice, C. O.& Kaufman, Y. J. (2003), *An enhanced contextual fire detection algorithm for MODIS*, Rem. Sen. Environment, 87:273-282.

Multi-spectral sensors on polar satellites are characterized by a relatively high spatial resolution, but, due to the long revisit time of polar satellites, the promptness needed for effective fire detection purposes cannot be achieved, even combining all existing multi-spectral polar sensors. On the contrary, multi-spectral geostationary sensors provide very frequent acquisitions, e.g. every 15 minutes for the MSG SEVIRI (Spinning Enhanced Visible and Infra Red Imager) sensor, though characterized by a lower spatial resolution (3×3 km² and above for infra-red channels), which could prevent small fires from being detected.

In order to overcome the spatial resolution limitations, a physical model-based approach for sub-pixel fires detection from geostationary sensors data was recently proposed by E. Cisbani, A. Bartoloni, M. Marchese, G. Elisei, A. Salvati, *Early fire detection system based on multi-temporal images of geostationary and polar satellites*, IGARSS 2002, Toronto, 2002, and Calle, A., Casanova, J. L., Moclan, C., Romo, A. J., Costantini, M., Cisbani, E., Zavagli, M., Greco, B., *Latest Algorithms and Scientific Developments for Forest Fire Detection and Monitoring Using MSG/SEVIRI and MODIS Sensors*, IEEE, 2005, 118-123.

In particular, an analytic Radiative Transfer Model (RTM) is proposed which characterizes the radiative phenomena that determine the sensor-detected energy, expressed by means of radiances $R_\lambda$ (W/m²/sr/μm) for each band λ in atmospherically transparent windows in Near Infrared (NIR), Middle Infrared (MIR) and Thermal Infrared (TIR) spectral regions. As shown in FIG. 1(a), the radiance $R_\lambda$ collected by a remote satellite sensor is the sum of the solar radiance $R_{S,\lambda}$ reflected by the ground, the atmospheric thermal radiance $R_{A,\lambda}$ (both the up-welling and the down-welling components), and, finally, the thermal emission of the ground. Given the background temperature $T_B$, the emissivity $\epsilon_\lambda$ of the Earth's surface, and the transmittance of the atmosphere $\tau_\lambda$ between the Earth's surface and the sensor, the RTM can be expressed as:

$$R_\lambda = \epsilon_\lambda \tau_\lambda B_\lambda(T_B) + R_{A,\lambda} + R_{S,\lambda}, \qquad (1)$$

where, $B_\lambda(T)$ is the Planck black-body emission at temperature T and wavelength λ. Other RTM models can be exploited as well.

According to C. C. Borel, W. B. Clodius, J. J. Szymanski and J. P. Theiler, *Comparing Robust and Physics-Based Sea Surface Temperature Retrievals for High Resolution, Multi-Spectral Thermal Sensors Using one or Multiple Looks*, Proc. of the SPIE'99, Conf. 3717-09, the main contribution to the transmittance $\tau_\lambda$ in the atmospheric windows in the NIR and TIR regions comes from the atmospheric water vapor content and the relations between transmittance and water vapor can be quite appropriately be parameterized by the following expression:

$$\tau_\lambda(W, \vartheta) = \exp\left(-\left[\frac{A_\lambda}{\cos\vartheta} + B_\lambda\left(\frac{W}{\cos\vartheta}\right)^{C_\lambda}\right]\right) \qquad (2)$$

where W is the total water vapour along the path ending/starting at/from the examined pixel and having a zenith angle θ. Parameters $A_\lambda$, $B_\lambda$ and $C_\lambda$ depend (at least) on the wavelength λ and can be estimated via several MODTRAN (MODerate resolution atmospheric TRANsmission) simulations (computer program designed to model atmospheric propagation of electromagnetic radiation from 100-50000 cm⁻¹ with a spectral resolution of 1 cm⁻¹) and regression methods. Other models/methods to estimate $\tau_\lambda$ can be considered.

The water vapour W content can be estimated as described in Eumetsat Satellite Application Facility, *Software Users Manual of the SAFNWC/MSG: Scientific part for the PGE06*, SAF/NWC/INM/SCI/SUM/06, issue 1.0, January 2002, but other methods can be considered.

The solar term $R_{S,\lambda}$ can be calculated as described in the aforementioned *Potential global fire monitoring from EOS-MODIS*:

$$R_{S,\lambda} = E_{S,\lambda}\cos(\vartheta_S)\tau_\lambda(z_{SE})\frac{1-\epsilon_\lambda}{\pi}\tau_\lambda(z_{ED}) \qquad (3)$$

where the $E_{S,\lambda}$ is the Sun radiance at the top of the atmosphere, $\tau_\lambda(z_{SE})$ is the transmittance along the path between Sun and Earth's surface, $\tau_\lambda(z_{ED})$ is the transmittance along the path between Earth's surface and satellite sensor, and $\epsilon_\lambda$ is the emissivity of the Earth's surface. Other models/methods can be exploited to calculate $R_{S,\lambda}$.

The atmospheric radiance contribution $R_{A,\lambda}$ describes a complex phenomenon, characterized by smoke, aerosol, and local atmospheric temperatures hard to be modelled. A possible model is the following:

$$R_{A,\lambda} = \underbrace{(1-\varepsilon_\lambda)\tau_\lambda(z_{ED})[1-\tau_\lambda(z_{TOA})]B_\lambda(T_A)}_{\text{down-welling}} + \underbrace{[1-\tau_\lambda(z_{ED})]B_\lambda(T_A)}_{\text{up-welling}} \quad (4)$$

where, referring to FIG. 1(b), the $\tau_\lambda(z_{TOA})$ is the transmittance along the vertical path between the Earth's surface and the top of the atmosphere, $\tau_\lambda(z_{ED})$ is the transmittance along the path between the Earth's surface and the satellite sensor, and $\varepsilon_\lambda$, as in the foregoing, is the ground emissivity.

The Dozier formulation as described in J. Dozier, *A Method for satellite identification of surface temperature fields of subpixel resolution*, Remote Sensing of Environment, 11 (1981) 221-229 and applied to equation (1) (or to other RTM models) makes a sub-pixel description of the radiative process possible, considering the fire extension (pixel fraction f of a pixel of radiance acquired by the satellite sensor) and fire temperature $T_F$:

$$R_\lambda = \varepsilon_{F,\lambda} \cdot \tau_\lambda \cdot B_\lambda(T_F) \cdot f + \varepsilon_{B,\lambda} \cdot \tau_\lambda \cdot B_\lambda(T_B) \cdot (1-f) + R_{A,\lambda} + R_{S,\lambda}, \quad (5)$$

where $\varepsilon_{F,\lambda}$ and $\varepsilon_{B,\lambda}$ are the fire and the background emissivities, respectively, at the wavelength $\lambda$.

According to the aforementioned *Early fire detection system based on multi-temporal images of geostationary and polar satellites*, if two successive acquisitions are considered, the Dozier formulation (5) can be written as follows:

$$\Delta R_{\lambda,t} = R_{\lambda,t} - R_{\lambda,t-\Delta t} = \varepsilon_\lambda \cdot \tau_{\lambda,t} \cdot [B_\lambda(T_F) - B_\lambda(T_B)] \cdot \Delta f \quad (6)$$

where t and t−Δt denote two close acquisition times, and $\Delta f = f_t - f_{t-\Delta t}$, and where the following assumptions are done:
- the background temperature $T_B$ is constant between two consecutive acquisitions (within 15 minutes for MSG SEVIRI data);
- the fire emissivity is the same as the non-burning surface emissivity; and
- the solar and the atmospheric terms ($R_{S,\lambda}$, $R_{A,\lambda}$) are considered constant between two consecutive acquisitions (within 15 minutes for MSG SEVIRI data).

The introduced RTM (1) and equations (2), (3), (4), (5), (6) are reliable only if no clouds are in the analyzed scene. Therefore, a reliable cloud masking procedure is necessary to identify the acquisitions that are compatible with the physical model assumptions. Many techniques have been developed for cloud masking by exploiting polar or geostationary sensors. Basically, all these techniques are based on the application of threshold criteria to analytic relations among the different bands of a single acquisition. Methods to retrieve such relations among the spectral bands can be based on physical models or on learning methods based on neural networks, Bayesian networks, support vector machines, all of which require a pre-processing phase for the system training. Also contextual techniques that exploit the spatial information are known in literature.

OBJECT AND SUMMARY OF THE INVENTION

The Applicant has noticed that the analysis disclosed in the aforementioned *Early fire detection system based on multi-temporal images of geostationary and polar satellites* and represented by the equation (6), where two successive acquisitions are exploited, suffers from rough approximations and strong restrictions which lead to unsatisfactory results for reliable applications. In particular, while the atmospheric contribution in the RTM can be considered slowly changing with time, the estimation of the atmospheric contribution $R_{A,\lambda}$ given by equation (4) in combination with equation (2) in the RTM is affected by a large uncertainty due to noise and model inaccuracy, and the non-linear form of the model given by equation (5) amplifies this uncertainty, so making the estimation of the fire parameters unreliable.

Moreover, the Applicant has also noticed that, at each new acquisition, the equation (6) is solved and Δf, $T_F$ and $T_B$ are estimated without exploiting previously computed results, i.e. Δf, $T_F$ and $T_B$ computed for the previous acquisitions.

The objective of present invention is to provide an improved automatic technique for fire detection from geostationary satellite multi-spectral data which overcomes the limitations of the known techniques.

This objective is achieved by the present invention in that it relates to a method for automatically detecting fires on Earth's surface and atmospheric phenomena such as clouds, veils, fog or the like, by means of a satellite system, as defined in the appended claims.

The present invention stems from the observation by the Applicant that many physical quantities in equation (1), such as the atmospheric contribution $R_{A,\lambda}$, the solar contribution $R_{S,\lambda}$, the transmittances $\tau_\lambda$ and the emissivities $\varepsilon_\lambda$ are highly temporally correlated. For this reason, knowledge and exploitation of many acquisitions of the same scene allows information of interest, such as fires, clouds and physical parameters estimations, to be retrieved with an higher accuracy and robustness than considering only one or two acquisitions.

In particular, the present invention achieves the aforementioned objective by exploiting, in addition to spectral and spatial information, also temporal information contained in the very frequent acquisitions made by the geostationary sensors, in order to detect even small fires (much smaller than the sensor spatial resolution), and clouds with robustness and accuracy. Preferably, the present invention is based on the combined use of a physical model of the radiative transfer process and a purely mathematical adaptive predictive algorithm to invert (solve) the RTM described by equations (1) and (5) exploiting a high number of acquisitions, much more than two. With respect to the technique based on equation (6), this inversion technique based on many acquisitions and on spectral and spatial information allows the physical parameters of interest to be estimated with higher accuracy and robustness.

BRIEF DESCRIPTION OF THE DRAWINGS

For a better understanding of the present invention, preferred embodiments, which are intended purely by way of example and are not to be construed as limiting, will now be described with reference to the attached drawings (all not to scale), wherein:

FIG. 2(a) shows radiances of a region of the Earth with successive fire activities acquired by MSG/SEVIRI sensor during a day;

FIG. 4 shows a table listing the fire detection probability corresponding to the overall burned area according to a preferred embodiment the present invention; and FIG. 5 shows a table listing the false detection rate corresponding to the estimated fire extension according to the secondary aspect of the present invention.

Figure 1A:
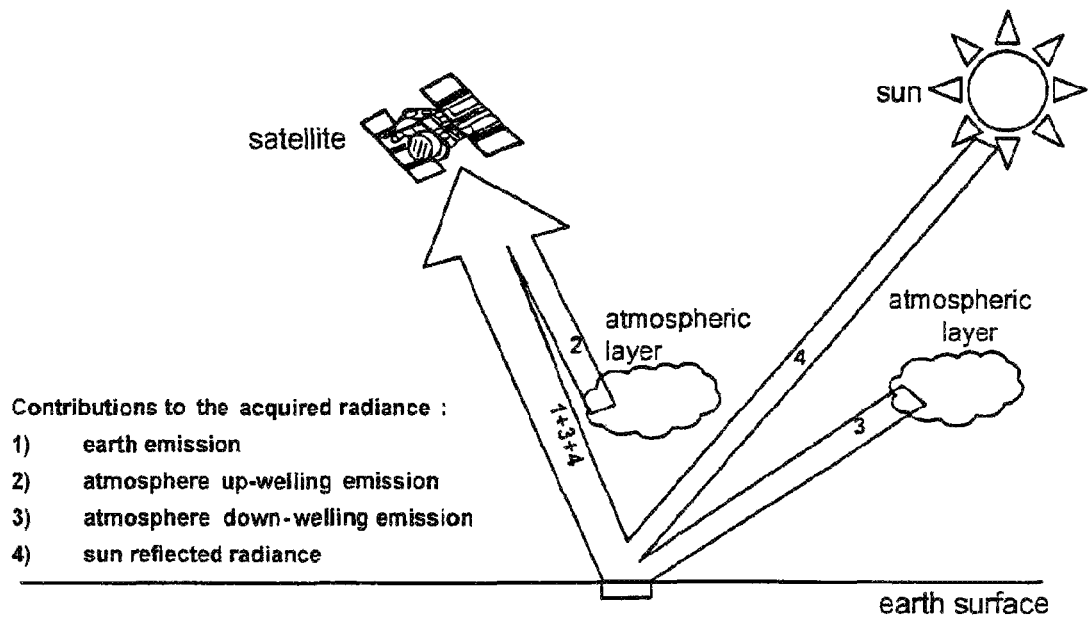
FIG. 1(a) shows schematically different contributions to the radiance acquired by a satellite sensor.
Figure 1B:
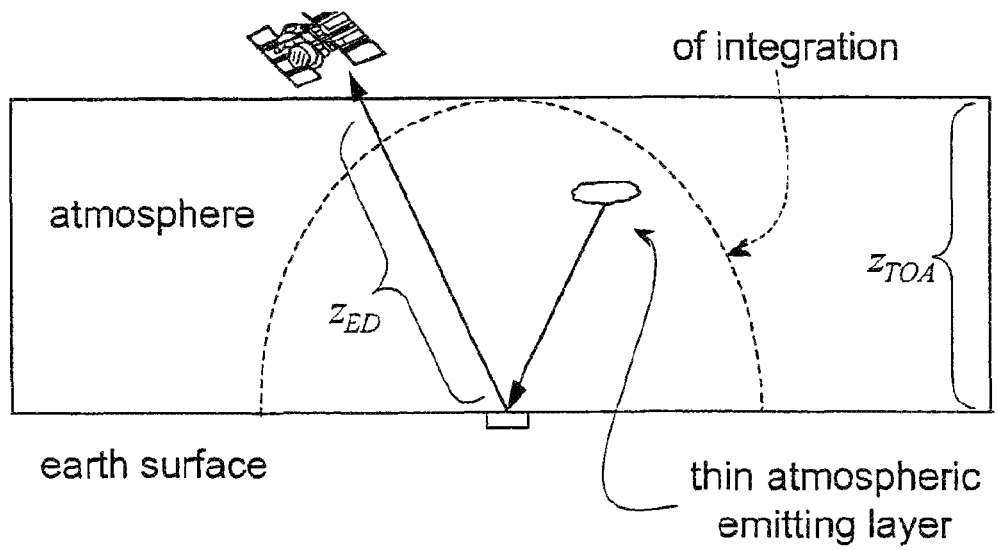
FIG. 1(b) shows the geometry of the down-welling thermal radiance emitted by the atmosphere.

DETAILED DESCRIPTION OF PREFERRED
EMBODIMENTS OF THE INVENTION

The following description is aimed at enabling a person skilled in the art to make and use the invention. Various modifications to the embodiments will be readily apparent to those skilled in the art, without departing from the scope of the present invention as claimed. Thus, the present invention is not intended to be limited to the embodiments shown, but is to be accorded the widest scope consistent with the principles and features disclosed herein and defined in the appended claims.

In order to improve the reliability of the estimation of the fire parameters, according to a secondary aspect of the present invention a differential or, more precisely, a finite difference form of the Dozier RTM is conveniently used, where differences of the radiances between two acquisitions at close times are considered:

$$\Delta R_{\lambda,t} = R_{\lambda,t} - R_{\lambda,t-\Delta t} = \epsilon_{F,\lambda} \cdot \tau_{\lambda,t} \cdot B_\lambda(T_F) \cdot [f_t - f_{t-\Delta t}] + + \epsilon_{B,\lambda} \cdot \tau_{\lambda,t} \cdot [B_\lambda(T_{B,t}) \cdot (1-f_t) - B_\lambda(T_{B,t-\Delta t}) \cdot (1-f_{t-\Delta t})] + R_{S,\lambda,t} - R_{S,\lambda,t-\Delta t}$$ (7)

In equation (7), the atmospheric term $R_{A,\lambda}$ has been neglected because assumed unchanged within few acquisitions (order of tens of minutes). Moreover, since different bands are considered, the spectrally uncorrelated part of the disturbances is filtered out in the solution of (7). This equation can be considered for SEVIRI channels in the atmospheric windows in order to form a solvable equation system.

In order to remove the rough approximations affecting equation (6) and the assumptions on which it is based, several parameters have been introduced. Indeed, the ground temperatures $T_{B,t}$ and $T_{B,t-\Delta t}$ at different times are considered different, the solar terms $R_{S,\lambda,t}$ and $R_{S,\lambda,t-\Delta t}$ are not neglected, and the fire and ground emissivities $\epsilon_{F,\lambda}$ and $\epsilon_{B,\lambda}$ are considered different.

Equation (7) has more unknown quantities than equation (6) and can be solved by means of a dynamic system approach. Indeed, the differential (or finite difference) Dozier RTM equation (7) can be considered as a dynamic system with the state variables $f_t$ and $T_{B,t}$:

$$\begin{pmatrix} f_t \\ T_{B,t} \end{pmatrix} = F\left( \begin{pmatrix} f_{t-\Delta t} \\ T_{B,t-\Delta t} \end{pmatrix}, T_F, \Delta R_{\lambda,t}, \Delta R_{S,\lambda,t}, \varepsilon_{F,\lambda}, \varepsilon_{B,\lambda}, \tau_{\lambda,t}; \Lambda \right)$$ (8)

where t and t−Δt denote two close acquisition times, $\Delta R_{\lambda,t} = R_{\lambda,t} - R_{\lambda,t-\Delta t}$, $\Delta R_{S,\lambda,t} = R_{S,\lambda,t} - R_{S,\lambda,t-\Delta t}$, and Λ is a set of wavelengths corresponding to the channels available in the atmospheric windows.

The dynamic equation (8) describes the time dynamic behavior of the Dozier RTM, where the quantities at the time t ($f_t$ and $T_{B,t}$) can be estimated by means of the knowledge of the quantities calculated at the previous time t−Δt. In particular, for instance, the solar term can be calculated by means of equation (3) and emissivities as described in the aforementioned *Early fire detection system based on multi-temporal images of geostationary and polar satellites*, but other method/models can be considered. The transmittance, for instance, can be estimated by means of a parameterization similar to that in equation (2). Sensitivity analysis of equation (8) and test on real data has shown that the fire temperature $T_F$ can be considered fixed (for instance at about 700° K) in order to increase the accuracy of the pixel fraction estimation. However, the fire temperature $T_F$ could be considered as an unknown quantity, so further generalizing the dynamic equation (8).

The dynamic system approach expressed in equation (8) represents a physical model of the radiative transfer process.

The introduction of further unknown quantities, as shown in equation (7), and the use of the dynamic system approach shown in equation (8) allows the pixel fraction and background temperature to be estimated with higher accuracy and robustness with respect to the approach based on equation (6).

At each acquisition, at least two bands are needed to solve equation (8) and to estimate the state variables $f_t$ and $T_{B,t}$. If further channels are available, their exploitation makes the solution more accurate. The MIR channel (3.9 μm wavelength) is particularly sensitive to the presence of fires and it is used in every algorithm for fire detection from remote sensors. Unfortunately, in the SEVIRI sensor the MIR channel has a low saturation level that does not allow its use for monitoring large fires. Equation (8) can be solved even if the MIR channel cannot be used because saturated. Moreover, the solution of equation (8) is particularly robust to data gaps, occurring when some acquisitions are missing or cannot be used due to cloud coverage. In fact, the fire parameters can be still estimated by using sufficiently close acquisitions instead of two consecutive ones.

The accuracy of estimation of the pixel fraction $f_t$ can be notably improved if oscillations with daily period are suppressed with a high-pass filter. This filtering is performed by removing from the last pixel fraction estimated by equation (8) the average of the previous consecutive N available pixel fractions (for instance 5 pixel fractions are enough):

$$\ddot{f}_t = f_t - \frac{1}{N} \sum_{i=1}^{N} f_{t-\Delta t_i}$$ (9)

The filtered pixel fraction $\ddot{f}_t$ is usefully exploited for fire detection. In fact, the accuracy of the filtered pixel fraction estimation obtained by using four bands of the SEVIRI/MSG sensor (1 MIR and 3 TIR channels) in the atmospheric windows is about $10^{-5}$.

Figure 2B:
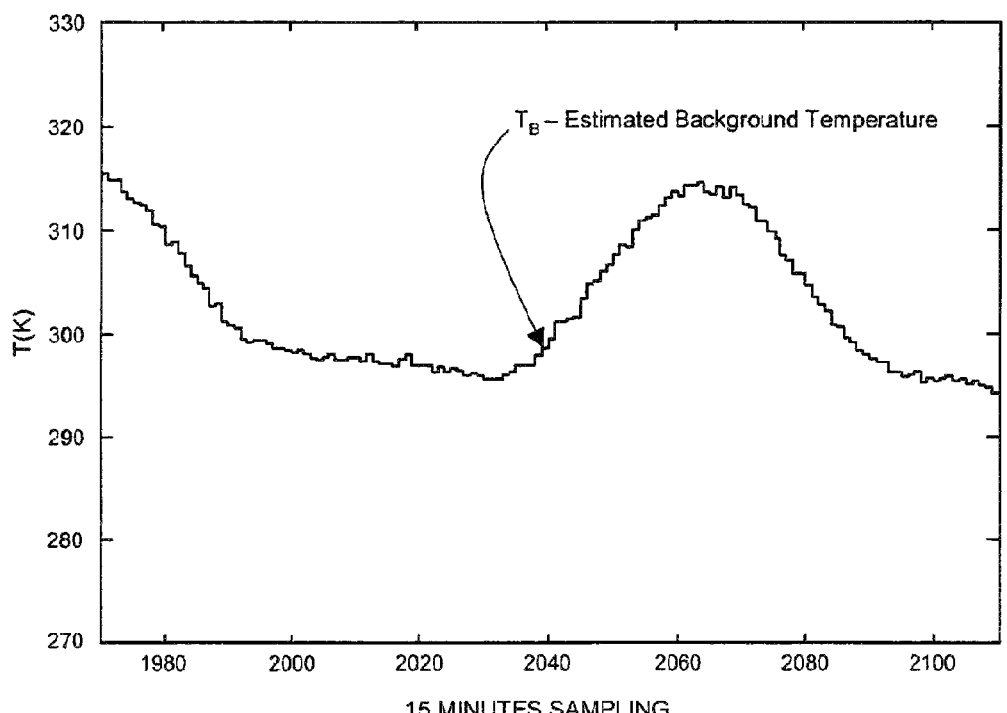
FIGS. 2(b) and 2(c) show estimated background temperature and fire extension, respectively, in the region of the Earth of FIG. 2(a), according to a secondary aspect of the present invention.
Figure 2C:
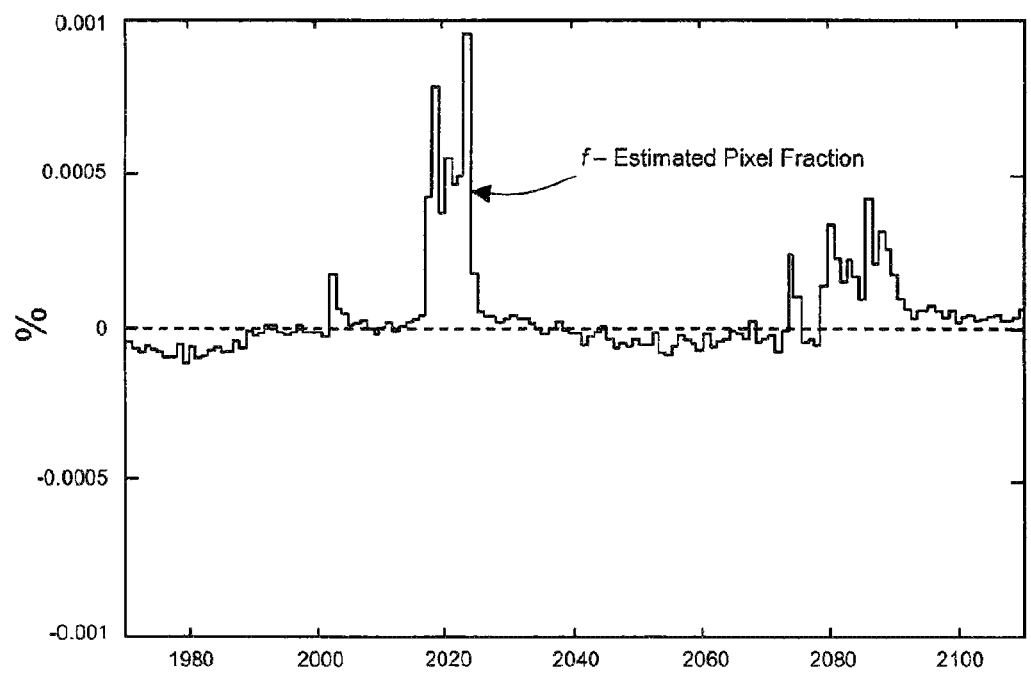

FIG. 2(a) shows the SEVIRI radiances (brightness temperature of the middle infrared and thermal infrared bands 3.9 μm, 8.7 μm, 10.8 μm, 12 μm) acquired during about a day in a pixel with successive fire activities, while FIGS. 2(b) and 2(c) show the corresponding estimated background temperature and the estimated pixel fraction, respectively.

A fire is detected when the filtered pixel fraction $\ddot{f}_t$ is above a given threshold. A good compromise between probabilities of detection and of false alarm has been obtained with a threshold that corresponds to an active fire size of about 2000 m² using MSG/SEVIRI data.

As previously said, accuracy of the estimation of the fire parameters and detection and false alarm performances are significantly reduced when clouds, cloud borders, thin clouds, veils, fog (or the like) and low transmittance atmospheric conditions arise. A reliable cloud masking procedure is necessary to identify the acquisitions that are compatible with the physical model assumptions.

In order to recognize these unfavorable atmospheric conditions, according to a primary aspect of the present invention an adaptive predictive algorithm is proposed which exploits the temporal information and correlations contained in a high number of acquisitions in order to detect clouds and fires.

The idea is that radiances vary slowly during a day and have an intrinsic periodicity of about one day, while the presence of clouds and/or fires adds high frequency oscillations, which also include data gaps. Quasi-periodicity of observed radiances during a clear-sky day without fires can be modeled by using few harmonic functions, and the model needs to be adapted in order to follow seasonal and other slow variations.

In particular, the adaptive predictive algorithm allows realizing an adaptive predictive model, wherein, exploiting SEVIRI/MSG data, a 24-hour spectral radiance sequence made up of a plurality of acquisitions at 96 acquisition times (every 15 minutes) is considered. The model is based on the estimation and filtering of the spectrum of the 24-hours spectral radiance sequence. The spectrum is evaluated by means of a Discrete Fourier Transform; then a low pass filter selects the harmonics of interest and, finally, the low-pass filtered signal is back-transformed. The adaptive predictive model is the back-transformed, low-pass filtered signal which is able to provide radiance predicted values.

In the following the adaptive predictive algorithm will be described step by step.

The first step consists of forming, for each pixel, a vector $h_\lambda$ ($h_\lambda(n)$, n=0, ..., 95) containing a sequence of 96 time-consecutive spectral radiances $R_\lambda$ relating to 24 hours and not necessarily acquired during the very same day. Should some acquisitions be unavailable, the relative spectral radiances may be computed by interpolation based on adjacent acquisitions.

In fact, for each pixel, several radiances acquired by the satellite sensor at different times and not affected by clouds or fires are needed.

In particular, the vector $h_\lambda$ may be conveniently formed by considering several neighbouring days. A clouds-free acquisition for each vector element can be recognized as the one assuming the maximum spectral radiance value in a TIR band among those corresponding to the same vector element in the considered days. An analogous criterion is adopted to recognize fire-free acquisitions in a MIR band. A fire-free acquisition for each clouds-free vector element already selected can be recognized as the one assuming the minimum spectral radiance value in a MIR band among those corresponding to the same vector element in the considered days.

The second step of the adaptive predictive algorithm consists of computing the Discrete Fourier Transform (DFT) of the vector $h_\lambda$, thus obtaining a vector $H_\lambda$ with 96 elements defined as:

$$H_\lambda(k) = \sum_{n=0}^{N-1} h_\lambda(n) e^{-j\frac{2\pi}{N}nk}, \quad k=0, \ldots, 95 \tag{10}$$

The third step consists of computing the adaptive predictive model associated to the $\lambda$ μm band. The adaptive predictive model is a vector $m_\lambda$ made up of 96 elements and defined as:

$$m_\lambda(n) = \frac{1}{N} H_\lambda(k) + \frac{1}{N} \sum_{k=1}^{A} \left[ H_\lambda(k) e^{j\frac{2\pi}{N}nk} + H_\lambda(N-k) e^{j\frac{2\pi}{N}n(N-k)} \right]. \tag{11}$$

In particular, $m_\lambda$ is the Inverse Discrete Fourier Transform of the low-pass filtered Discrete Fourier Transform of the vector $h_\lambda$. The low-pass filter selects the continuous component (harmonic 0) and the first A harmonics (harmonic 1, 2, ..., A) of the Discrete Fourier Transform of the vector $h_\lambda$. For instance, with A=2, the model is reliable enough to fit a non-cloudy radiance trend during 24 hours.

Each $n^{th}$ sample of the model $m_\lambda$ contains the predicted value for the spectral radiance acquired at a given time of the day. For this reason, it is necessary to store the index $\bar{n}$ which points the element of $m_\lambda$ relative to the last acquisition. In particular, assuming that the current acquisition at the time t is relative to the index $\bar{n}$, the predicted radiance at the time t is given by the value $m_\lambda(\bar{n})$:

$$R_{PRD,\lambda} = \tag{12}$$
$$m_\lambda(\bar{n}) = \frac{H_\lambda(0)}{N} + \frac{1}{N} \sum_{k=1}^{A} \left[ H_\lambda(k) e^{j\frac{2\pi}{N}\bar{n}k} + H_\lambda(N-k) e^{j\frac{2\pi}{N}\bar{n}(N-k)} \right]$$

The fourth step of the adaptive predictive algorithm is the cloud/fire detection which consists of checking if the predicted spectral radiance $R_{PRD,\lambda}$ differs from the corresponding acquired spectral radiance $R_\lambda$ using some thresholds. The cloud detection considers data acquired at 10.8 μm or at the 12.0 μm, while the fire detection considers data acquired at 3.9 μm.

In particular, the thresholds used in such detection procedure are three. The first one $th_{DET,10.8}$ and the second one $th_{DET,12}$ are used for the cloud detection allowing the comparison between the predicted values at 10.8 μm or at 12 μm and the spectral radiances acquired in such bands. The third threshold $th_{DET,3.9}$ is used for the fire detection in a similar way in the band 3.9 μm.

More in detail, comparing the predicted value $R_{PRD,\lambda}$ with the acquired spectral radiance $R_\lambda$, a cloud is detected
if $R_{PRD,10.8} - R_{10.8} > th_{DET,10.8}$; or
if $R_{PRD,12} - R_{12} > th_{DET,12}$;
and a fire is detected, also if a cloud has been detected,
if $R_{3.9} - R_{PRD,3.9} > th_{DET,3.9}$.

The adaptive predictive algorithm is able to correctly detect two different types of clouds: thick and thin clouds.

Figure 3A:
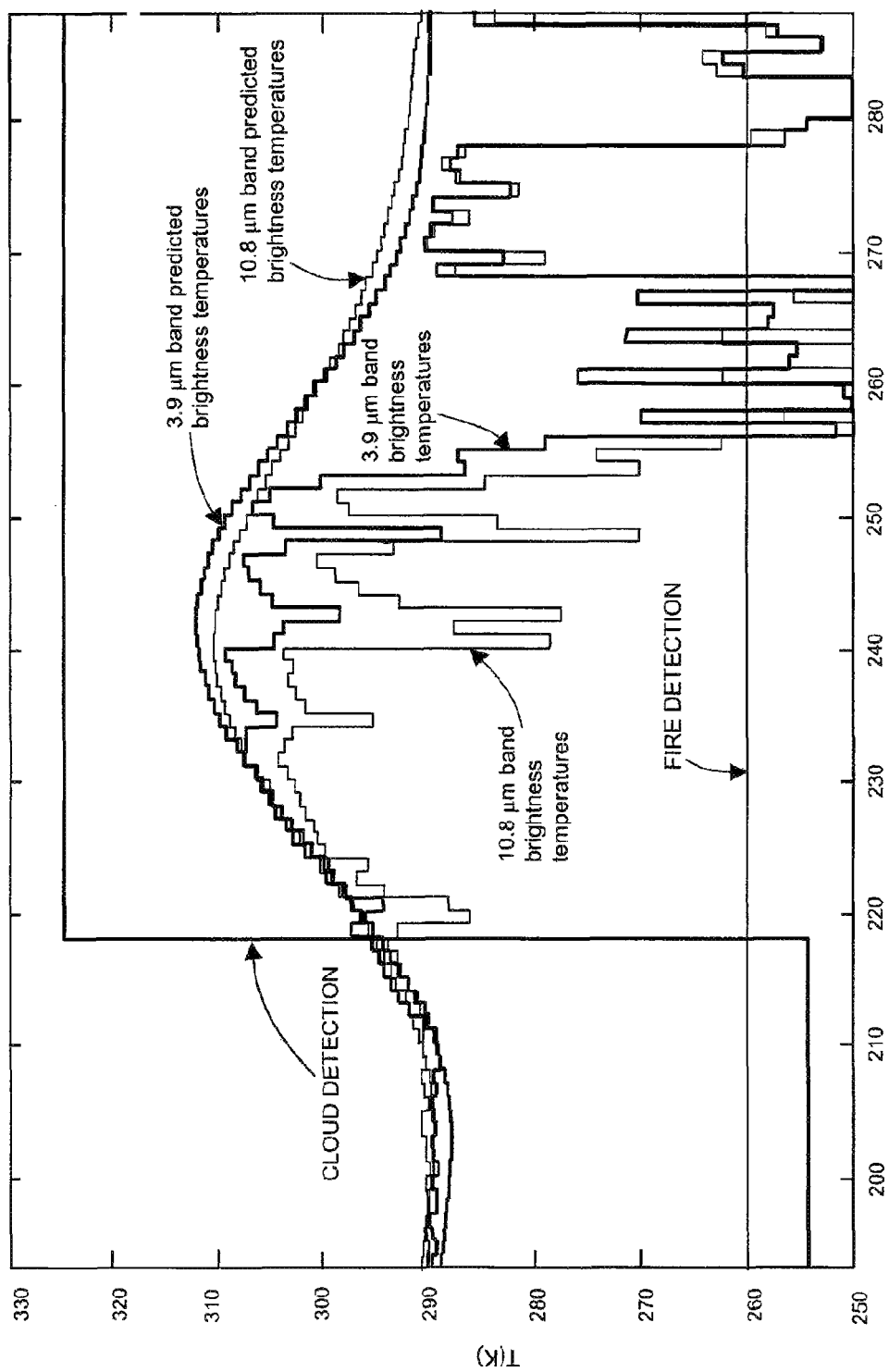
FIGS. 3(a) and 3(b) show plots of radiances of a region of the Earth measured and predicted according to a primary aspect of the present invention.
Figure 3B:
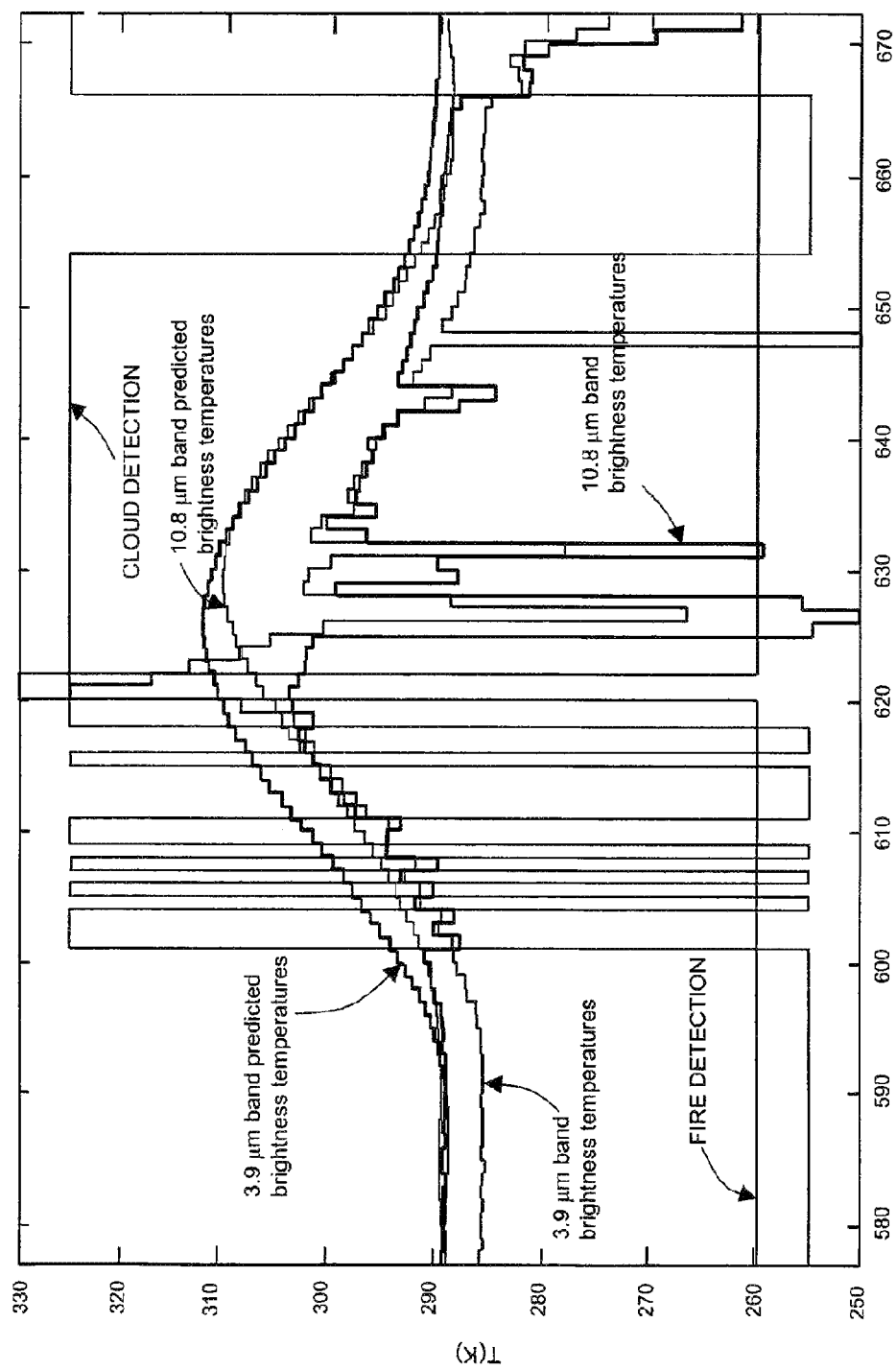

FIGS. 3(a) and 3(b) show plots of radiances measured and predicted according to the adaptive predictive algorithm during cloudy days. In particular, in FIG. 3(a) is shown the detection of clouds in absence of fire, while in FIG. 3(b) is shown the detection of both clouds and fires.

The fifth step of the adaptive predictive algorithm consists of updating the vector $h_\lambda$ in order to follow seasonal and other slow variations of the radiances. If an acquisition is valid and it is not identified as a fire or a cloud, it is used to update the vector $h_\lambda$. Also in this procedure three thresholds, $th_{UPD,10.8}$, $th_{UPD,12}$ and $th_{UPD,3.9}$, are used to identify valid data to be used for updating the vector $h_\lambda$.

In particular, acquired radiances $R_{10.8}$, $R_{12}$ and $R_{3.9}$ are considered valid if no anomalies are detected:
an anomaly at 10.8 μm is detected if $R_{PRD,10.8} - R_{10.8} > th_{UPD,10.8}$;
an anomaly at 12 μm is detected if $R_{PRD,12} - R_{12} > th_{UPD,12}$;
and an anomaly at 3.9 µm is detected if $R_{3.9} < R_{PRD,3.9} - th_{UPD,3.9}$ or if $R_{3.9} > R_{PRD,3.9} + th_{UPD,3.9}$.

If the current radiance $R_\lambda$ is valid, it replaces in the vector $h_\lambda$ the radiance contained in the position $\bar{n}$ (index relative to the current acquisition $R_\lambda$); otherwise the predicted radiance $R_{PRD,\lambda}$ replaces in the vector $h_\lambda$ the radiance value contained in the position $\bar{n}$.

At each new acquisition, the pointer $\bar{n}$ is increased modulo 96 and the above described procedure is repeated starting from the second step of the adaptive predictive algorithm.

Note that the algorithm can be generalized and the tests on the validity of the radiances or on the presence of fires or clouds can be applied also to acquisitions at times before the last one, in order to refine previously obtained results based also on the new data as they become available.

The adaptive predictive model has high tracking capabilities even with long time acquisitions series affected by cloud coverage or missing data.

The adaptive predictive algorithm is used as a pre-processing step to determine when physical model can be applied. If no clouds are detected by the adaptive predictive algorithm in the analyzed pixel, along with the adaptive predictive model also the physical model can be exploited in order to detect fires and estimate the fire size (pixel fraction $f_t$) and the background temperature $T_B$; otherwise, when clouds cover the analyzed pixel, only the adaptive predictive algorithm can still detect powerful fires. An example of this second case is shown in FIG. 3(b), where a fire is detected under thin clouds. The analysis of the 10.8 µm band highlights the presence of clouds that are correctly detected by the adaptive predictive algorithm. The oscillating results are due to the alternating occurrence of small clouds and clear sky. A big fire is detected by the adaptive predictive algorithm, though clouds are present and the physical model cannot be used.

A validation of the automatic fires detection method hereby disclosed has been performed using ground truth data relative to the Italian regions Sardinia, Lazio and Calabria, provided by the Italian Civil Protection Department. Two periods of 15 consecutive days in July 2004 and 15 consecutive days in August 2005 have been considered. These periods were characterized by not very cloudy days and a lot of occurrences of fires, in particular 286 fires occurred in areas greater than one hectare.

The validation has been carried out comparing the results obtained by the automatic fires detection method and the ground truth data. In particular, the fires have been classified in five groups depending on the size of the burned area as reported in the ground truth data. Concerning this, it is important to note that the automatic fires detection method detects the size of the flame frontline, which is the size of the real active fire and is much smaller than the overall burned area, while ground truth data reported only the overall burned area size.

For each burned area size class the probability of detection has been estimated as the detection rate: $P_d = N_{TP}/(N_{TP} + N_{FN})$, where $N_{TP}$ is the number of true positive cases and $N_{FN}$ the number of the false negative ones. The results are reported in the table shown in FIG. 4. As shown in FIG. 4, the fire detection probability increases with the increase of the overall burned area. The probability of false alarm has been estimated by means of the false alarm rate: $P_{fa} = N_{FP}/(N_{FP} + N_{TN})$, where $N_{FP}$ is the number of false positive occurrences and $N_{TN}$ is the number of the true negative ones.

The probability of false alarm does not depend on the fire size, in fact the estimation found in the performed validation has been $P_{fa} = 5.36 \cdot 10^{-6}$, that means only 5 pixels per million erroneously detected as fires.

Another interesting index of the reliability of the automatic fires detection method is the false detection rate, defined as $P_{fd} = N_{FP}/(N_{FP} + N_{TP})$. This quantity depends on the estimated fire size, i.e. on the estimated pixel fraction ($f_t$). In FIG. 5 is shown a table reporting the false detection rate for different estimated fire sizes. As shown in FIG. 5, the false detection rate decreases with the increase of the estimated fire size.

From the foregoing, it may be immediately appreciated that the automatic fires detection method hereby disclosed allows to perform a reliable and robust fire detection both in presence and in absence of clouds. In particular, in absence of clouds covering the analyzed pixel, the method is able to reliably detect a fire and estimate the fire size and the background temperature, while, in presence of thin clouds, it is still able to detect fires. Moreover, the adaptive predictive algorithm is able to correctly detect the presence of thin and thick clouds in the analyzed pixel.

Finally, it is clear that numerous modifications and variants can be made to the present invention, all falling within the scope of the invention, as defined in the appended claims.

The invention claimed is:

1. A method for automatically detecting fires on Earth's surface and atmospheric phenomena in Earth's atmosphere by means of a satellite system, the method comprising:

acquiring multi-spectral images of the Earth at different times by means of a multi-spectral satellite sensor, each multi-spectral image being a collection of single-spectral images each associated with a respective wavelength ($\lambda$), each single-spectral image being made up of pixels each indicative of a spectral radiance ($R_\lambda$) from a respective area of the Earth;

computing an adaptive predictive model predicting spectral radiances ($R_{PRD,\lambda}$) at a considered time for considered pixels on the basis of previously acquired spectral radiances ($R_\lambda$) of the considered pixels and of spectral radiances ($R_{PRD,\lambda}$) previously predicted for the considered pixels by said adaptive predictive model;

comparing acquired spectral radiances ($R_\lambda$) of the considered pixels at a considered time with spectral radiances ($R_{PRD,\lambda}$) predicted at the same considered time for the considered pixels by the adaptive predictive model; and detecting a fire in areas of the Earth's surface or an atmospheric phenomenon in areas of the Earth's atmosphere corresponding to the considered pixels on the basis of an outcome of the comparison, wherein computing an adaptive predictive model includes:

computing, for each considered pixel, a temporal harmonic analysis of the spectral radiances of the pixel related to different times, and acquired at, or predicted for the same wavelength ($\lambda$); and computing the adaptive predictive model based on computed low-frequency components of the spectral radiances so as to filter out high-frequency changes in the spectral radiances due to fires on Earth's surface or atmospheric phenomena, wherein computing, for each considered pixel, a temporal harmonic analysis includes:

forming a vector ($\lambda$) containing the spectral radiances related to different times, and acquired at or predicted for the same wavelength ($\lambda$); and computing the temporal harmonic analysis of the vector ($h_\lambda$)

classifying as valid or invalid acquired spectral radiances ($R_\lambda$) according to a given criterion;

and wherein forming a vector ($h_\lambda$) further comprises:

updating the vector ($h_\lambda$) with the acquired spectral radiances ($R_\lambda$) if they are classified as valid or with the corresponding predicted spectral radiances ($R_{PRD,\lambda}$) if the acquired spectral radiances ($R_\lambda$) are classified as invalid.

2. The method of claim 1, wherein the temporal harmonic analysis is a Fourier analysis.

3. The method of claim 1, wherein detecting a fire in an area of the Earth's surface or an atmospheric phenomenon in an area of the Earth's atmosphere corresponding to a considered pixel comprises:
   detecting an atmospheric phenomenon if the acquired spectral radiance ($R_\lambda$) of the pixel is lower than the corresponding predicted spectral radiance ($R_{PRD,\lambda}$) of a given threshold value ($th_{DET,\lambda}$); and
   detecting a fire if the acquired spectral radiance ($R_\lambda$) of the pixel is higher than the corresponding predicted spectral radiance ($R_{PRD,\lambda}$) of a given threshold value ($th_{DET,\lambda}$).

4. The method of claim 3, wherein an atmospheric phenomenon is detected in an area of the Earth's atmosphere corresponding to a pixel by using the adaptive predictive model, the acquired spectral radiance of the pixel ($R_{10.8}$) and the threshold ($th_{DET,10.8}$) associated with the 10.8 µm wavelength or by using the adaptive predictive model, the acquired spectral radiance of the pixel ($R_{12}$) and the threshold ($th_{DET,12}$) associated with the 12 µm wavelength; and wherein a fire is detected in an area of the Earth's surface corresponding to a pixel by using the adaptive predictive model, the acquired spectral radiance of the pixel ($R_{3.9}$) and the threshold ($th_{DET,3.9}$) associated with the 3.9 µm wavelength.

5. The method of claim 1, wherein forming a vector ($h_\lambda$) comprises:
   forming an initial vector ($h_\lambda$) containing spectral radiances ($R_\lambda$) of the considered pixel acquired at the same wavelength ($\lambda$) and at different times and not affected by fires, clouds, veils, fog or the like.

6. A method for automatically detecting fires on Earth's surface and atmospheric phenomena in Earth's atmosphere by means of a satellite system, the method comprising:
   acquiring multi-spectral images of the Earth at different times by means of a multi-spectral satellite sensor, each multi-spectral image being a collection of single-spectral images each associated with a respective wavelength ($\lambda$), each single-spectral image being made up of pixels each indicative of a spectral radiance ($R_\lambda$) from a respective area of the Earth;
   computing an adaptive predictive model predicting spectral radiances ($R_{PRD,\lambda}$) at a considered time for considered pixels on the basis of previously acquired spectral radiances ($R_\lambda$) of the considered pixels and of spectral radiances ($R_{PRD,\lambda}$) previously predicted for the considered pixels by said adaptive predictive model;
   comparing acquired spectral radiances ($R_\lambda$) of the considered pixels at a considered time with spectral radiances ($R_{PRD,\lambda}$) predicted at the same considered time for the considered pixels by the adaptive predictive model; and
   detecting a fire in areas of the Earth's surface or an atmospheric phenomenon in areas of the Earth's atmosphere corresponding to the considered pixels on the basis of an outcome of the comparison, wherein computing an adaptive predictive model includes:
      computing, for each considered pixel, a temporal harmonic analysis of the spectral radiances of the pixel related to different times, and acquired at, or predicted for the same wavelength ($\lambda$); and
      computing the adaptive predictive model based on computed low-frequency components of the spectral radiances so as to filter out high-frequency changes in the spectral radiances due to fires on Earth's surface or atmospheric phenomena and wherein forming an initial vector ($h_\lambda$) comprises:
         forming an initial vector ($h_\lambda$) containing spectral radiances ($R_\lambda$) of the considered pixel acquired at the same wavelength ($\lambda$) and at different times and not affected by fires, clouds, veils, fog or the like;
         considering several neighbouring days;
         recognizing a clouds-free acquisition for each vector element as the one assuming the maximum spectral radiance value in the 10.8 or 12 µm wavelength band among those corresponding to the same vector element in the considered days; and
         recognizing a fire-free acquisition for each clouds-free vector element already selected as the one assuming the minimum spectral radiance value in 3.9 µm wavelength band among those corresponding to the same vector element in the considered days
      wherein computing, for each considered pixel, a temporal harmonic analysis includes:
         forming a vector ($h_\lambda$) containing the spectral radiances related to different times, and acquired at or predicted for the same wavelength ($\lambda$); and
         computing the temporal harmonic analysis of the vector ($h_\lambda$).

7. The method according to claim 1, wherein updating the vector ($h_\lambda$) comprises:
   replacing in the vector ($h_\lambda$) the spectral radiances at given times with the corresponding acquired spectral radiances ($R_\lambda$) classified as valid or with the corresponding predicted spectral radiances ($R_{PRD,\lambda}$).

8. A method for automatically detecting fires on Earth's surface and atmospheric phenomena in Earth's atmosphere by means of a satellite system, the method comprising:
   acquiring multi-spectral images of the Earth at different times by means of a multi-spectral satellite sensor, each multi-spectral image being a collection of single-spectral images each associated with a respective wavelength ($\lambda$), each single-spectral image being made up of pixels each indicative of a spectral radiance ($R_\lambda$) from a respective area of the Earth;
   computing an adaptive predictive model predicting spectral radiances ($R_{PRD,\lambda}$) at a considered time for considered pixels on the basis of previously acquired spectral radiances ($R_\lambda$) of the considered pixels and of spectral radiances ($R_{PRD,\lambda}$) previously predicted for the considered pixels by said adaptive predictive model;
   comparing acquired spectral radiances ($R_\lambda$) of the considered pixels at a considered time with spectral radiances ($R_{PRD,\lambda}$) predicted at the same considered time for the considered pixels by the adaptive predictive model; and
   detecting a fire in areas of the Earth's surface or an atmospheric phenomenon in areas of the Earth's atmosphere corresponding to the considered pixels on the basis of an outcome of the comparison;
   providing a physical model relating the spectral radiances ($R_\lambda$) of the pixels in the multi-spectral images acquired at different times and physical quantities representing thermodynamic phenomena occurring on the Earth's surface, including a possible fire on the Earth's surface, in the Earth's atmosphere, such as clouds, veils, fog or the like, and related to the Earth and the Sun relative positions; and,
   when, at a given time (t), no atmospheric phenomenon is detected in an area of the Earth's atmosphere corresponding to a considered pixel, computing in the physical model, for the considered pixel, a background temperature ($T_{B,t}$) and a pixel fraction ($f_t$) representing an extension of a possible fire in an area of the Earth's surface corresponding to the considered pixel on the basis of the spectral radiance ($R_{\lambda,t}$) of the considered pixel at the given time (t), of a previously acquired spectral radiance ($R_{\lambda,t-\Delta t}$) of the considered pixel, of a pixel fraction ($f_{t-\Delta t}$) previously computed in the same physical model for the same considered pixel, and of the background temperature ($T_{B,t-\Delta t}$) previously computed in the same physical model for the same considered pixel.

9. The method of claim 8, wherein providing a physical model comprises:
providing a dynamic multi-spectral equation system comprising at least one single-spectral equation associated with a respective wavelength ($\lambda$), and relating the spectral radiances ($R_\lambda$) of the considered pixels in single-spectral images acquired at different times to the physical quantities at the same times;
and wherein computing in the physical model, for the considered pixel, a background temperature ($T_{B,t}$) and a pixel fraction ($f_t$) comprises:
computing the pixel fraction ($f_t$) and the background temperature ($T_{B,t}$) by solving the dynamic multi-spectral equation system at the given time (t) for the considered pixel on the basis of the pixel fraction ($f_{t-\Delta t}$) and the background temperature ($T_{B,t-\Delta t}$) previously computed by having solved the dynamic multi-spectral equation system at a previous time (t-$\Delta t$) for the same considered pixel.

10. The method of claim 9, wherein the single-spectral equations in the dynamic multi-spectral equation system are based on differences between equations relating the spectral radiances ($R_\lambda$) acquired at different times to the physical quantities at the same times.

11. The method according to claim 9, wherein the physical quantities in the physical model comprise at least one of the following quantities:
a fire temperature ($T_F$);
a Sun radiance ($R_{S,\lambda}$);
a fire emissivity ($\epsilon_{F,\lambda}$);
a background emissivity ($\epsilon_{B,\lambda}$); and
an Earth's atmosphere transmittance ($\tau_\lambda$).

12. The method of claim 11, wherein the dynamic multi-spectral equation system is:

$$\begin{pmatrix} f_t \\ T_{B,t} \end{pmatrix} = F\left( \begin{pmatrix} f_{t-\Delta t} \\ T_{B,t-\Delta t} \end{pmatrix}, T_F, \Delta R_{\lambda,t}, \Delta R_{S,\lambda,t}, \varepsilon_{F,\lambda}, \varepsilon_{B,\lambda}, \tau_{\lambda,t}; \Lambda \right)$$

wherein t and t-$\Delta t$ denote two different times, $\lambda$ denotes a considered wavelength, $f_t$ and $f_{t-\Delta t}$ denote the pixel fraction, $T_{B,t}$ and $T_{B,t-\Delta t}$ denote the background temperature, $T_F$ denotes the fire temperature, $\Delta R_{\lambda,t}=R_{\lambda,t}-R_{\lambda,t-\Delta t}$ denotes a spectral radiance difference, $\Delta R_{S,\lambda,t}=R_{S,\lambda,t}-R_{S,\lambda,t-\Delta t}$ denotes a Sun radiance difference, $\epsilon_{F,\lambda}$ denotes the fire emissivity, $\epsilon_{B,\lambda}$ denotes the background emissivity, $\tau_{\lambda,t}$ denotes the Earth's atmosphere transmittance and $\Lambda$ denotes a set of considered wavelengths ($\lambda$);
and wherein:
the pixel fraction ($f_t$) and the background temperature ($T_{B,t}$) at the time t are obtained by solving the dynamic multi-spectral equation system;
the spectral radiance difference ($\Delta R_{\lambda,t}$) is directly computed from the acquired multi-spectral images;
the fire temperature ($T_F$), the Sun radiance difference ($\Delta R_{S,\lambda,t}$), the fire emissivity ($\epsilon_{F,\lambda}$), the background emissivity ($\epsilon_{B,\lambda}$) and the Earth's atmosphere transmittance ($\tau_{\lambda,t}$) are computed independently;
the pixel fraction ($f_{t-\Delta t}$) and the background temperature ($T_{B,t-\Delta t}$) at the time t-$\Delta t$ are computed by solving the dynamic multi-spectral equation system at a previous iteration wherein at the first iteration the fire extension ($f_{t-\Delta t}$) and the background temperature ($T_{B,t-\Delta t}$) are set to respective values independently.

13. The method according to claim 8, further comprising:
detecting a fire in an area of Earth's surface whether the pixel fraction ($f_t$) computed for the corresponding pixel satisfies a given criterion.

14. The method of claim 13, wherein detecting a fire in an area of the Earth's surface whether the pixel fraction ($f_t$) computed for the corresponding pixel satisfies a given criterion includes:
filtering the pixel fraction ($f_t$) computed for a pixel by subtracting from the computed pixel fraction ($f_t$) a value correlated to a low-pass filtered sequence of previously computed pixel fractions ($f_{t-\Delta t}$); and
detecting a fire in an area of the Earth's surface whether the filtered pixel fraction ($\ddot{f}_t$) computed for the corresponding pixel is higher than a given threshold.

15. A processor in communication with the sensor configured to implement the method according to claim 1.

16. A software stored on a non-transitory computer readable medium and loaded in a processing system and configured to implement, when run, the method according claim 1.

* * * * *